W. J. MANDLEY.
MACHINE FOR GRINDING LAWN MOWERS.
APPLICATION FILED FEB. 17, 1912.

1,043,948.

Patented Nov. 12, 1912.

2 SHEETS—SHEET 1.

Witnesses.
H. L. Trimble.
D. Tuck.

Inventor.
Wm. J. Mandley
by
H. J. S. Dennison
Atty

UNITED STATES PATENT OFFICE.

WILLIAM JOHN MANDLEY, OF SHELBURNE, ONTARIO, CANADA.

MACHINE FOR GRINDING LAWN-MOWERS.

1,043,948. Specification of Letters Patent. Patented Nov. 12, 1912.

Application filed February 17, 1912. Serial No. 678,357.

*To all whom it may concern:*

Be it known that I, WILLIAM JOHN MANDLEY, a subject of the King of Great Britain, and resident of the town of Shelburne, in the county of Dufferin, in the Province of Ontario, in the Dominion of Canada, have invented certain new and useful Improvements in Machines for Grinding Lawn-Mowers, of which the following is a specification.

The invention relates to improvements in machines for grinding lawn mowers, as described in the following specification and illustrated in the accompanying drawings that form part of the same.

The invention consists essentially in the novel construction and arrangement of parts, whereby the mower is adjustably supported from a movable carriage arranged above the grinder wheel so that the cutting edges of the lower cutter bar and reel may be brought into engagement with the grinder wheel to effect an accurate grinding thereof.

The objects of the invention are, to devise a grinder machine of simple, strong and durable construction upon which the cutter blades of lawn mowers may be quickly and accurately ground without the necessity of the mower being taken apart and which may be utilized for general purposes and may be manufactured at very low cost.

Figure 1:
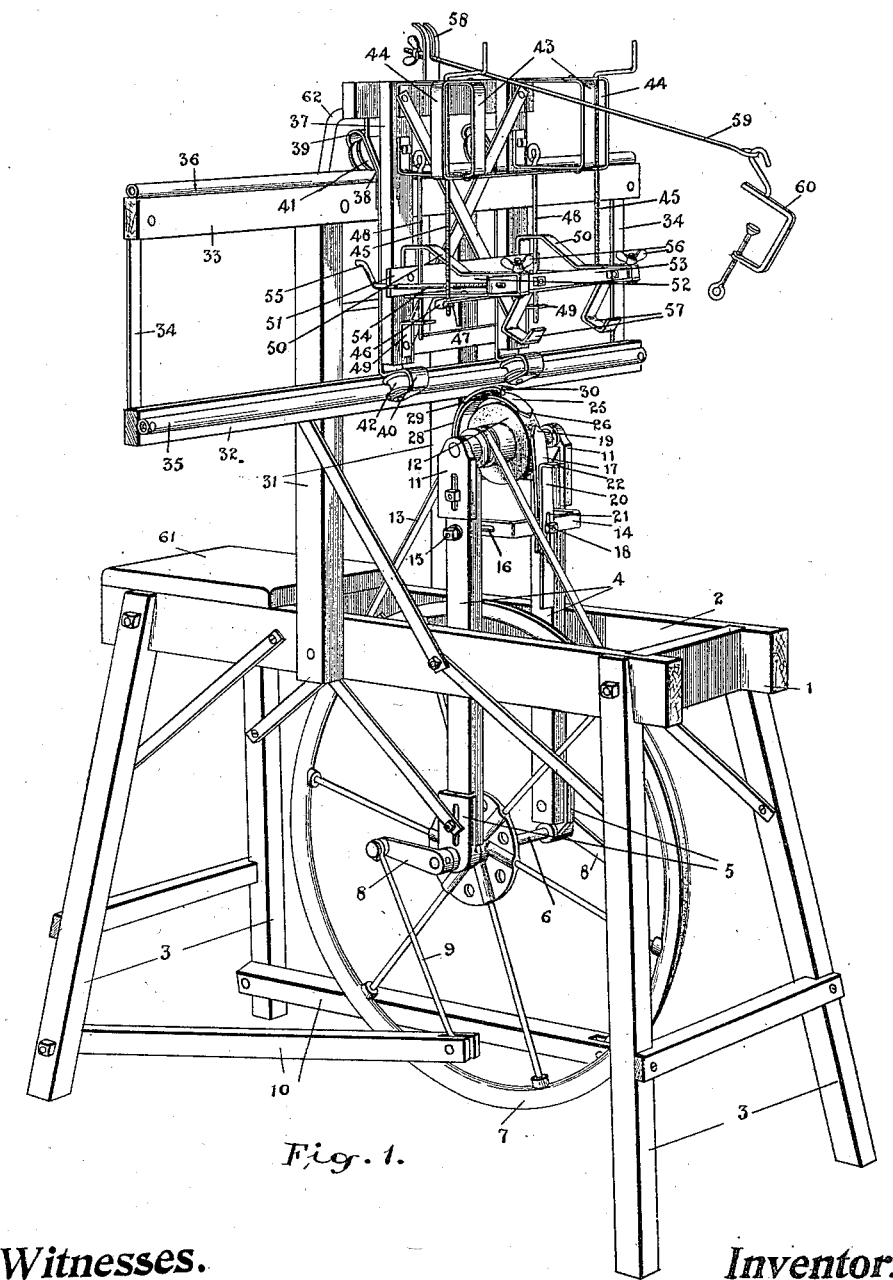
Figures 2, 3:
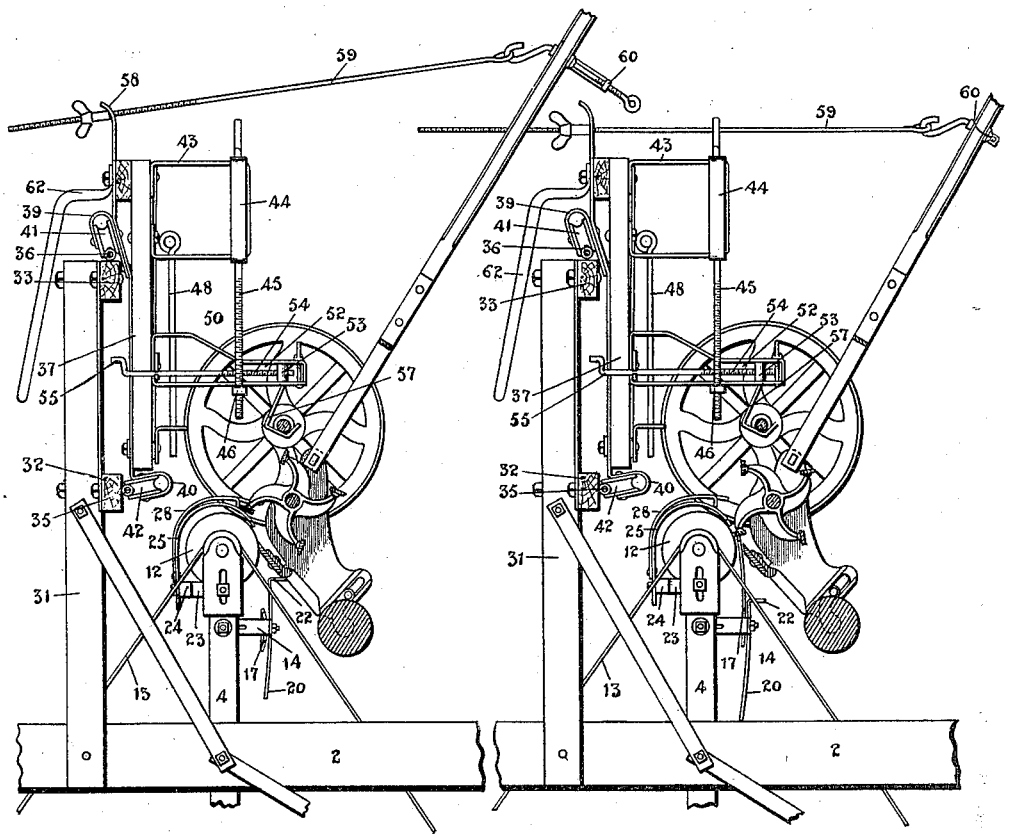

In the drawings, Figure 1 is a perspective view of a machine constructed in accordance with this invention. Fig. 2 is a side elevational view of the upper portion of the machine showing the mower in section with the bottom cutter blade in position for grinding. Fig. 3 is a side elevational view of the upper portion of the machine showing the mower in section with one of the reel blades in position for grinding.

Like numerals of reference indicate corresponding parts in each figure.

Referring to the drawings, 1 is the main frame of the machine comprising a narrow rectangular frame 2 having the legs 3 secured thereto.

4 are a pair of vertically arranged standards rigidly secured to the sides of the frame 2 and having the journals 5 at the bottom ends thereof supporting the axis 6 of the main driving wheel 7, said drive wheel being operated by the cranks 8, connecting rods 9 and pedals 10.

11 are journal brackets adjustably secured to the upper ends of the standards 4 and supporting the spindle of the grinder wheel 12.

13 is a belt connecting the drive wheel 7 with the grinder wheel spindle.

14 is a rectangular frame extending in front of the grinder wheel and is adjustably secured to the standards 4 by the bolts 15 extending through the slots 16 in the extremities of said frame.

17 is a flat bar pivotally supported on a bolt 18 extending through the center of the frame 14, said bar having its upper end 19 beveled off to each side from a central point and arranged close to the grinder wheel.

20 is a bar having a longitudinal slot 21 therein and is adjustably secured to the bolt 18 on the front side of the frame 14, said bar having a forwardly bent upper end forming a supporting bracket 22.

23 is a frame secured to the inner sides of the standards 4 above the frame 14 and extending rearwardly of the grinder wheel and having the offset portion 24 to allow the belt 13 to pass.

25 is a flat bar adjustably secured to the frame 23 by a suitable bolt and extending upwardly therefrom and bent forwardly over the grinder wheel 12 and having its front end 26 beveled off to each side from a central point, said point extending close to the point of the bar 17.

28 is a flat bar secured to the bar 25 and bent closely thereto having the forward end 29 split longitudinally and having one side thereof bent downwardly to meet the upper side of the bar 25, the extending finger 30 with the downwardly bent portion 29 forming a guide-way adapted to receive the reel blade of the mower.

31 are a pair of uprights rigidly secured to the sides of the frame 2 to the rear of the standards 4 and supporting a pair of cross bars 32 and 33 extending laterally across and beyond the sides of the frame, said cross bars being braced at their extremities by the bars 34.

35 and 36 are lengths of pipes or rods secured to the forward and upper sides respectively of the cross bars 32 and 33.

37 is a carriage formed of a rigid frame having the metal strips 38 secured to the rear side thereof and bent to form the loop-shaped ends 39 and 40, at the top and bottom respectively.

41 and 42 are grooved rollers journaled in the looped members 39 and 40 respectively and resting upon the pipes 36 and 35. The upper looped ends 39 are arranged in acute angular relation to the uprights of the carriage and the lower looped ends 40 are arranged tilted slightly from the horizontal. The carriage rests upon the track-way and is free to travel back and forth thereon but may be easily and quickly lifted off when desired.

43 are a pair of rectangular shaped brackets rigidly secured to the forward side of the carriage 37 at the top thereof and extending forwardly therefrom.

44 is a rectangular frame looped around the outer ends of the brackets 43 and rigidly secured thereto. The ends of said frame extend slightly beyond the sides of said brackets.

45 are rods extending through the projecting ends of the frame 44 and formed with cranked upper ends and threaded lower ends.

46 is a bar extending between the threaded lower ends of the cranked rods 45 and supported upon the nuts 47 threaded on said cranked rods, said nuts being held from rotation by the downwardly turned ends of said bar.

48 are rods formed with eye-shaped upper ends extending through the brackets 43 close to the carriage and held at the lower end by the angular shaped brackets 49 secured to said carriage.

50 are a pair of frames each formed of a length of flat bar and supported upon and secured to the cross bar 46 and having their large rearward ends sliding on the rods 48, said frames being rigidly connected together at their rear ends by the cross bar 51. The upper portion of the frames 50 is bent downwardly and forwardly to form the forwardly projecting guide-ways 52.

53 is a bar bent inwardly at the ends and supported upon its edges in the guide-ways 52, the looped ends extending beyond the guide-ways and having threaded nuts arranged therein through which the horizontally threaded adjusting rods 54 extend, said adjusting rods being rotatably held in the projecting ends of the rear cross bar 51 and having cranked ends 55.

56 are bolts extending through the guide-ways 52 close to the ends and having suitable wing nuts thereon adapted to squeeze the guide-ways tightly upon the adjustable cross bar 53 to hold it rigidly.

57 are a pair of hook shaped members rigidly secured to the adjustable cross bar 53 and extending downwardly therefrom, the hooks 57 are adapted to receive the wheel axle of the mower and form an adjustable support to suspend the mower above the grinder wheel.

58 is a forked bar projecting upwardly from the carriage 37 centrally of its width and having its upper forked end bent rearwardly.

59 is a rod threaded at one end and extending through the fork 58 and having a suitable thumb nut thereon, said rod having a clamp 60 loosely supported on its outer end.

In the use of this device the operator lifts the mower into place, placing the axle thereof in the hooks 57. The clamp 60 is then secured to the handle of the mower and as it is desirable to grind the lower cutter knife first, the bolt 18 in the frame 14 is loosened and the bar 17 is swung laterally moving the upper end 19 thereof away from the grinder wheel. The rod 59 is then adjusted so that the lower cutter blade of the mower is brought into proper relation with the grinder wheel and the bar 20 is then adjusted so that the outwardly bent upper portion 22 engages the cutter bar holder forming a rest.

In the proper setting of the machine the hook carrying cross bar 53 may be adjusted forwardly or rearwardly by means of the adjusting rods 54 and the frames supporting said hook carrying member may be adjusted vertically by means of the threaded cranks 45. When the proper adjustment is obtained the cross bar 53 is locked and held rigidly by the bolts 56. The operator sitting on the seat 61 at the rear end of the machine rotates the grinder wheel by means of the pedals 10 and moves the carriage 37 back and forth on its track-ways bringing the full length of the cutter blade into engagement with the grinder wheel, a suitable handle 62 being secured to the rear of said carriage. When the lower cutter bar is being ground, one of the cutter blades of the reel extends under the finger 30 at the forward end of the curved bar 28 extending over the grinder wheel and as the carriage is moved back and forth the guide formed by said bar turns the reel on its journal so as to prevent the reel blades from interfering or coming in contact with the grinder wheel. When the lower cutter blade has been properly ground the rod 59 is adjusted to swing the mower outwardly. The bar 20 is then loosened and dropped downwardly as shown in Fig. 3 and the bar 17 raised to its upper position. One of the cutter blades of the reel is inserted between the adjacent points of the bar 17 and the bar 25. The pointed guides allow the curved blade perfect freedom of movement. The several parts may then be adjusted to bring the reel blade into proper position for grinding and the carriage then is operated back and forth as the grinder wheel is rotated. When the adjustment is made for one blade the other blades are ground to the same adjustment, thus insuring perfect grinding of the reel blades to effect the proper cutting.

It will be readily seen that a machine such as described renders the work of grinding lawn mowers very simple and obviates any necessity for taking them apart. The cost of grinding is therefore reduced to a minimum.

The machine may be very quickly converted to an ordinary grinder by simply lifting off the carriage and removing the upright frame.

What I claim as my invention is:—

1. In a machine for grinding lawn mowers, the combination with a suitable frame and grinder wheel, of a carriage movably supported above the grinder wheel, and adjustable means supported on said carriage adapted to engage the frame of the mower suspending the said mower above the grinder wheel to bring the cutter bars into contact therewith.

2. In a machine for grinding lawn mowers, the combination with a suitable frame and grinder wheel, of a carriage movably supported on said frame, a movable frame supported from said carriage and adapted to be adjusted vertically, and horizontally adjustable means supported on said vertically adjustable frame adapted to engage the mower frame to support the machine above the grinder wheel bringing the blades into contact therewith.

3. In a machine for grinding lawn mowers, the combination with a suitable frame and grinder wheel, of a carriage movably supported above the grinder wheel, vertical guide-ways supported on said carriage, a frame slidably arranged on said vertical guide-ways and having horizontal guide-ways therein, a rigid frame arranged above said adjustable frame, threaded members rotatably supported in said rigid frame and having their threaded ends connected to said adjustable frame, a horizontal bar slidably arranged in said horizontal guide-ways and arranged transversely in relation to the grinder wheel frame, means for adjusting said horizontal bar, and hook members supported from said horizontal bar and adapted to support the mower above said grinder wheel.

4. In a machine for grinding lawn mowers, the combination with a suitable frame and grinder wheel, of a carriage movably supported above the grinder wheel, vertical guide-ways supported on said carriage, a frame formed of a pair of bracket shaped members slidably arranged on said vertical guide-ways, each of said bracket portions having looped ends extending horizontally and formed with parallel top and bottom sides forming horizontal guide-ways, a cross bar extending transversely through said looped ends and having nuts secured in the outer ends, threaded crank members horizontally arranged and extending through said threaded nuts and adapted to move said transverse bar horizontally, bolts extending through the looped ends of said brackets and adapted to clamp said transverse bar, hook members carried by said transverse bar adapted to suspend the mower, and means for adjusting said adjustable frame vertically.

5. In a machine for grinding lawn mowers, the combination with a suitable frame and grinder wheel, of a transverse trackway rigidly supported above said frame, a carriage supported on said track-way, means adjustably supported on said carriage for suspending the mower above the grinder wheel, an adjustable rod adapted to be clamped to the mower handle and having an adjusting nut threaded on one end thereof, and a fork member rigidly secured to said carriage and extending upwardly therefrom and adapted to receive said adjustable rod.

6. In a machine for grinding lawn mowers, the combination with a suitable frame and grinder wheel, of a supplementary frame rigidly secured to said grinder wheel frame and extending upwardly therefrom and having transverse members extending beyond the sides of said frame, a track arranged on the top of the upper transverse member, a track arranged on the front side of the lower transverse member, a carriage frame, a plurality of looped brackets secured to said carriage frame, grooved wheels journaled in said brackets and running on said tracks and adapted to support said carriage frame, and means adjustably arranged on said carriage frame for supporting the mower above the grinder wheel.

7. In a machine for grinding lawn mowers, a rigid frame, a pair of standards supported from said frame, a grinder wheel journaled between said standards, an adjustable carriage supported on said frame and adapted to engage the frame of the mower suspending it above the grinder wheel, and a guide member adapted to engage one of the reel blades of the mower to cause said reel to rotate so as not to come in contact with the grinder wheel as the mower is moved laterally in the grinding of the lower cutter blade.

8. In a machine for grinding lawn mowers, a rigid frame, a pair of standards supported from said frame, a grinder wheel journaled between said standards, a movable carriage supported above the grinder wheel and adapted to adjustably suspend the mower, a flat bar bent in arc shape extending over the top of said grinder wheel and having a pointed extremity, a bar adjustably secured at the front side of said grinder wheel and extending upwardly and having a pointed end adapted to extend into close proximity to the pointed end of the upper guide, said pointed members forming a guide to hold the reel blade in proper relation with the grinder wheel in the grinding thereof as the carriage is moved back and forth.

Signed at the town of Shelburne, in the county of Dufferin, in the Province of Ontario, in the Dominion of Canada, this second day of February 1912.

WILLIAM JOHN MANDLEY.

Witnesses:
G. M. VANCH,
INEZ LAKING.

Copies of this patent may be obtained for five cents each, by addressing the "Commissioner of Patents, Washington, D. C."